United States Patent
Kelley, Jr. et al.

[15] 3,693,069
[45] Sept. 19, 1972

[54] GATING CONTROL FOR A STATIC SWITCHING ARRANGEMENT WITH IMPROVED CONDUCTION ANGLE BALANCING MEANS

[72] Inventors: Fred W. Kelley, Jr., Media, Pa.; Georges R. E. Lezan, Cherry Hill, N.J.

[73] Assignee: General Electric Company

[22] Filed: Nov. 9, 1971

[21] Appl. No.: 196,885

[52] U.S. Cl. ............. 323/24, 307/252 T, 323/22 SC, 323/34
[51] Int. Cl. ............................................. G05f 1/44
[58] Field of Search ......... 307/252 T; 321/16, 18, 38; 323/22 SC, 24, 34–38, 39

[56] References Cited

UNITED STATES PATENTS

| R26,866 | 4/1970 | Storm | 323/4 |
| 3,470,450 | 9/1969 | Eriksson et al. | 321/16 |
| 3,525,032 | 8/1970 | Torok | 321/38 X |
| 3,582,755 | 6/1971 | Liss et al. | 321/38 X |
| 3,654,541 | 4/1972 | Kelly, Jr. et al. | 323/24 X |
| 3,633,094 | 1/1972 | Clements | 323/24 |

Primary Examiner—Gerald Goldberg
Attorney—J. Wesley Haubner et al.

[57] ABSTRACT

A gating control for a switching arrangement comprising a pair of thyristors which are alternately gated into conduction by gating pulses for predetermined conduction angles. First balancing means compares the conduction angles of alternate thyristors on those pairs of successive conducting periods during which a first one of the thyristors conducts preceding a second one of the thyristors and derives a first-balance indicating signal indicative of the difference between the conduction angles compared by the first balancing means. Second balancing means compares the conduction angles of alternate thyristors on those pairs of successive conducting periods during which the second thyristor conducts preceding said first thyristor and derives a second balance-indicating signal indicative of the difference between the conduction angles compared by this second balancing means. For forcing the conduction angles of the alternate thyristors toward equality, means sensitive to the first balance-indicating signal varies the gating angles at which gating pulses are delivered to the first thyristor; and means sensitive to the second balance-indicating signal varies the gating angles at which gating pulses are delivered to the second thyristor.

6 Claims, 6 Drawing Figures

(a) SWITCH VOLTAGE FOR 0.67 PER UNIT INPUT WITH INDUCTIVE CIRCUIT

Fig. 2.

(b) SWITCH VOLTAGE FOR 0.67 PER UNIT INPUT WITH RESISTIVE CIRCUIT (c) FUNCTION GENERATOR 27 OUTPUT WAVETRAIN (d) FREQUENCY ATTENUATOR 34 OUTPUT WAVETRAIN (e) SUM OF INPUTS TO SUMMING CIRCUIT 40

(f) PULSE GENERATOR 58 OUTPUT WAVETRAIN

Fig. 3.

GATING CONTROL FOR A STATIC SWITCHING ARRANGEMENT WITH IMPROVED CONDUCTION ANGLE BALANCING MEANS

CROSS REFERENCE TO RELATED APPLICATION

This invention is an improvement of the invention described and claimed in application Ser. No. 120,509–Kelley et al., filed March 3, 1971, and assigned to the assignee of the present invention.

BACKGROUND

This invention relates to a gating control for a static switching arrangement comprising a pair of thyristors which are alternately triggered into conduction to allow successive loops of current to flow through alternate thyristors. The invention is particularly concerned with a gating control that controls the phase angle, or gating angle, at which each thyristor is triggered into conduction.

An example of the type of static switching arrangement that we are concerned with is an a-c static switch comprising a pair of thyristors connected in inverse parallel relationship. Such a static switch is open when all of its constituent thyristors are turned off, and it is closed when the thyristors are turned on and conducting. In an a-c switch, the inversely poled thyristors conduct alternately, and they are cyclically triggered into conduction in synchronism with the source voltage. The moment of triggering is conveniently expressed as an electrical angle referenced to zero crossings of the source voltage, which angle is referred to hereinafter as the gating angle. The time during which the thyristor conducts following triggering is referred to hereinafter as the conduction angle. When this conduction angle is substantially 180° for each thyristor, the switch is considered to be fully-on; and when substantially 0° is considered to be fully-off.

Source voltage is applied to the load in the power circuit only during the conducting intervals of the switch, and therefore the average or mean value of load voltage will depend on when the thyristors are triggered and how long they conduct each cycle. In conventional a-c phase-controlled switches, the load voltage is varied between maximum and zero by appropriately varying (retarding or advancing) the gating angle.

For controlling the conduction angle of the thyristors, an input signal is supplied to the gating control of the switch, and the gating control responds to this input signal by adjusting the conduction angle of the switch to a value dependent upon the magnitude of the input signal. For positive input signal of 1 per unit or greater, a conduction angle of substantially 180° (i.e., a fully-on condition) is desired. For an input signal of 0 or of a negative value, a substantially zero conduction angle (i.e., a fully-off condition) is desired. For a positive input signal between 0 and 1 per unit, a conduction angle approximately proportional to the input signal is desired.

In order for the control of the aforesaid application to maintain the desired approximately proportional relationship of conduction angle to input signal, it is necessary that the control be provided with means for forcing the conduction angles of the two thyristors to be substantially equal during successive conduction periods. This is especially important where the switch is used in a power circuit where the power factor is widely different from unity, e.g., a highly inductive power circuit.

To force the conduction angles of the two thyristors to be substantially equal during successive conduction periods, the control of the aforesaid Kelley et al application employs conduction-angle balancing means which measures and compares the conduction angles of the two thyristors on successive half cycles. A balance-indicating signal is derived from this comparison, and this balance-indicating signal is used by the control to modify the gating angle of a preselected one of the two thyristors in such a manner that the conduction angles of the two thyristors are forced toward a condition of equality.

While the above described conduction-angle balancing means is satisfactory for many applications, it has been found that in certain applications, if the gating angle is rapidly changed over a wide range or the power factor of the load is rapidly changed over a wide range, instabilities resulting in asymmetrical current conditions may develop which this control is not capable of eliminating within an acceptable time period.

SUMMARY

An object of the present invention is to provide conduction-angle balancing means which has improved capability for forcing the conduction angles of the two thyristors into a condition of equality and, more specifically, improved capability for performing this function despite rapid and wide changes in the gating angle or in the power factor of the load.

There is another problem that may arise with the conduction-angle balancing means of the Kelley et al. application if the static switch is operating in a fully-on condition and, for some reason, asymmetry develops which causes the conduction angle of one of the thyristors to exceed 180° while the other is less than 180°. To equalize the two conduction angles once this condition has developed, it is necessary either to shorten the conduction angle of the thyristor with the conduction angle exceeding 180° (i.e., the first thyristor), or to lengthen the conduction angle of the other thyristor (i.e., the second thyristor). If the first thyristor is the preselected one which is being controlled by the conduction-angle balancing means, then the necessary shortening of its conduction angle can be made simply by retarding its triggering point. But if the second thyristor is the preselected one which is being controlled, then the control will be unable to effect the required lengthening of its conduction angle. To effect such lengthening, it is necessary to advance the triggering point of the second thyristor, but this cannot be done because when the switch is fully on, the first thyristor will be conducting until the original triggering point of the second thyristor is reached, thereby applying a reverse bias across the non-conducting second thyristor and preventing it from being turned on by any gating signal received while the first one is still conducting.

Accordingly, another object is to provide a conduction-angle balancing control which is capable of equalizing the conduction angles even though the switching arrangement is fully on and one thyristor has a conduction angle exceeding 180°, irrespective of which thyristor has the conduction angle exceeding 180°.

In carrying out our invention in one form, we provide, for controlling a switching arrangement comprising a pair of thyristors, a gating control comprising means for developing gating pulses that are delivered to alternate thyristors at predetermined gating angles during successive half cycles of voltage appearing across the switching arrangement, thus causing alternate thyristors successively to conduct for predetermined conduction angles. The gating control further comprises (1) first balancing for measuring and comparing the conduction angles of alternate thyristors on those pairs of successive conducting periods during which a first one of said thyristors conducts preceding a second one of said thyristors and for deriving a first balance-indicating signal having a magnitude indicative of the difference between the conduction angles compared by said first balancing means, and (2) second balancing means for measuring and comparing the conduction angles of alternate thyristors on those pairs of successive conducting periods during which said second thyristor conducts preceding said first thyristor and for deriving a second balance-indicating signal having a magnitude indicative of the difference between the conduction angles compared by said second balancing means. For forcing the conduction angles on successive conducting periods toward equality, means sensitive to said first balance-indicating signal is provided for varying as a function of the magnitude of the first balance-indicating signal the gating angles at which said gating pulses are delivered to said first thyristor; and means sensitive to said second balance-indicating signal is provided for varying as a function of the magnitude of said second balance-indicating signal the gating angles at which said gating pulses are delivered to said second thyristor.

BRIEF DESCRIPTION OF DRAWINGS

For a better understanding of the invention, reference may be had to the following description taken in conjunction with the accompanying drawings, wherein:

FIG. 1 is a schematic diagram of a static switch with a gating control embodying one form of our invention. FIG. 1 spans two sheets of the drawings and comprises FIG. 1a and FIG. 1b.

DETAILED DESCRIPTION OF PREFERRED EMBODIMENT

The Power Circuit Components

Figure 1A:
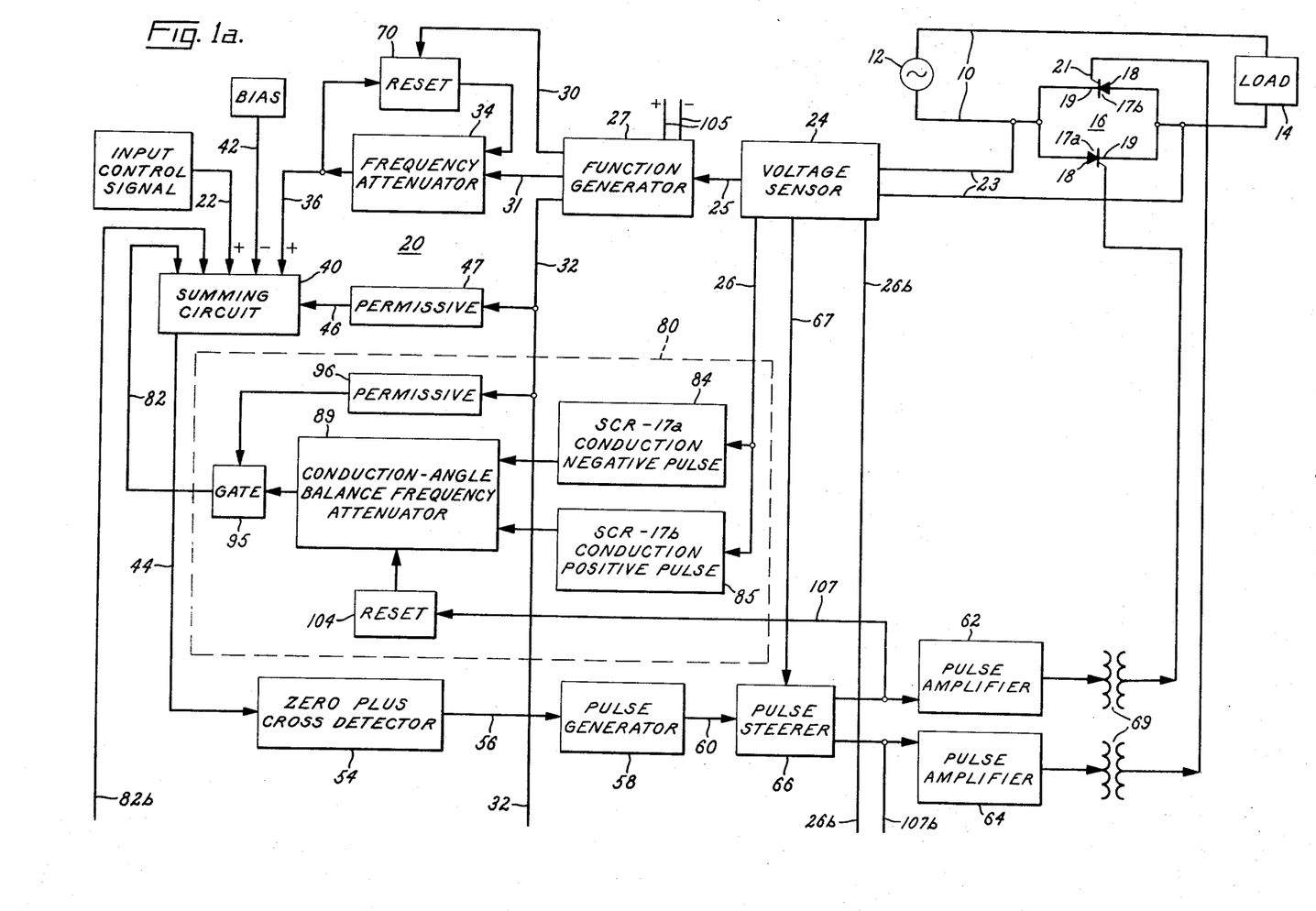

Referring now to FIG. 1a, there is shown an a-c power circuit 10 that comprises a source 12 of alternating voltage, a load 14, and a static switch 16. The load 14 and the static switch 16 are connected in series with each other across the terminals of source 12. It will be assumed that the load is one which has a power factor that is subject to wide variations or changes while the power circuit is in operation. An example of such a load is an induction furnace, where the impedance and power factor vary widely as the charge within the furnace is melted. Under certain conditions, the effective load may be almost entirely inductive.

The illustrated static switch 16 comprises a pair of thyristors, in the form of conventional silicon controlled rectifiers (SCRs) 17a and 17b, connected in inverse parallel relationship in the power circuit. Each thyristor has a nonconducting or blocking state in which it presents very high impedance to the flow of current and a conducting or turned-on state in which it freely conducts forward current with only a relatively slight voltage drop. It can be switched abruptly from the blocking state to the turned-on state by the concurrence of a forward bias on its main electrodes (anode 18 at a positive potential with respect to cathode 19) and a trigger signal on its gate 21. The time at which the thyristor is turned on, measured in electrical degrees from the cyclically recurring instant at which the source voltage becomes positive is referred to as the "gating angle".

Once turned on, a thyristor 17a or 17b will continue conducting until its "forward current" is subsequently reduced below a given holding level by the action of the external circuit in which the thyristor is connected. This turn-off process is generally referred to as "commutation". The time during which the thyristor is turned on measured in electrical degrees from the instant of turn-on to the instant of commutation is referred to as the "conduction angle".

Although, for simplicity, we have shown only one thyristor in each conducting branch of the switch circuit, it is to be understood that for higher current switches, additional thyristors can be connected in parallel with each thyristor, and for higher voltage switches, additional thyristors can be connected in series with each thyristor.

Sensing Voltage Across Static Switch 16 and Developing an Off-Time Indicating Signal For controlling the gating angle and hence the conduction angle of each thyristor 17a, 17b, we provide a gating control 20 which responds to a unidirectional input signal received via an input control channel 22 to produce gating of the thyristors at gating angles dependent upon the magnitude of the input signal. Control 20 comprises, first of all, a voltage sensor 24 which senses the instantaneous voltage present across static switch 16 and produces an output at 25 whenever this voltage exceeds a predetermined threshold value. This threshold value is selected to be slightly higher than the maximum voltage drop across the thyristor when in its forward current conducting state. By way of example, in a power circuit having a 600 volt r.m.s. source, each thyristor 17a and 17b might be a commercially available silicon controlled rectifier having a maximum forward drop of 1.5 volts when conducting 100 amperes and less than 4 volts at 5,500 amperes peak surge current. In this example, 5 volts is selected as a practical threshold value at which the detecting means 24 operates to develop its output at 25. It is noted that this threshold value is about 1 percent of the r.m.s. source voltage and is attained by the source voltage in less than one electrical degree as it rises from a natural voltage zero. If additional series-connected thyristors are present, this threshold value would be increased accordingly.

The voltage sensor 24 may be of any suitable conventional design but is preferably of the design shown in more detail and claimed in application Ser. No. 836,765–Kelley et al., filed June 26, 1969, and assigned to the assignee of the present invention. The voltage sensor 24 is shown in FIG. 1 with input leads 23 connected across the switch 16. The voltage sensor includes a suitable isolating transformer (not shown in the present application) which electrically insulates the output components of the voltage sensor from its input components.

The output from the voltage sensor 24 is supplied via channel 25 to a conventional function generator 27 which instantaneously responds to this output from the voltage sensor to develop a constant magnitude indicating signal on its output channels 30, 31, and 32. In the graphic representation of FIG. 2, this first indicating signal is shown at 35 in FIG. 2c.

This first indicating signal 35 is supplied via channel 31 to a frequency attenuator 34, preferably in the form of an integrator, which develops on its output channel 36 a second indicating signal that rises progressively so long as the first indicating signal is received via channel 31. This second indicating signal, referred to hereinafter as the "off-time indicating signal", is shown at 38 in FIG. 2d, where it can be seen that it rises substantially linearly so long as the input signal 35 is received.

The off-time indicating signal 38 is supplied via channel 36 to a summing circuit 40 that has five primary input channels 22, 36, 42, 82, and 82b and an output channel 44. Input channel 22 is the channel through which the input control signal is supplied. Input channel 42 is a channel through which a bias signal, soon to be described, is supplied. Input channel 36 is the channel through which the off-time indicating signal 38 is supplied to the summing circuit. Input channel 82 is a channel through which a balance-indicating signal is supplied indicative of the difference in conduction angles of the two thyristors 17a and 17b.

Comparing the Off-Time Indicating Signal with an Effective Input Control Signal The summing circuit 40 is able to add together the signals supplied thereto via input channels 22, 42, 36 and 82, provided it is turned on and maintained turned on by an enabling signal (soon to be described) supplied via a permissive channel 46. Assuming such turn-on, the summing circuit 40 develops on channel 44 an output signal equal to the sum of these input signals at 22, 42, 36 and 82.

For the present, it will be assumed that the conduction angles of the two thyristors are equal and that no signal is therefore being received via channel 82. The off-time indicating signal 38 and the input control signal at 22 are of positive polarity; and the bias signal at 42 is of a negative polarity. The sum of these signals is an output signal such as illustrated at 50 in FIG. 2e. This output signal 50 rises towards zero from a negative base level 52 determined by the sum of the negative bias signal and the positive input control signal. FIG. 2e depicts this base level in dotted-line form. If there is no input control signal at 22, the output signal 50 will not cross zero during a 180° rise of the indicating signal 38. But if there is a positive input control signal at 22, the base level 52 will be nearer to zero, and the output signal 50 will accordingly cross the zero line before the expiration of 180 electrical degrees.

For sensing the instant that the output signal 50 crosses the zero line, a zero plus crossing detector 54 of conventional form is provided. This crossing detector responds to the zero crossing by immediately developing an output on channel 56 upon such a zero crossing. It is understood that a zero crossing occurs when the input signal rises from a negative value or from zero to a value slightly exceeding zero. To briefly summarize the operation of summing circuit 40 and the zero plus crossing detector 54, the sum of the positive input control signal at 22 and the negative bias signal at 42 can be thought of as the effective input control signal for the gating control 20. This effective input control signal has a magnitude represented by the dotted horizontal line 52 of FIG. 2e. Summing circuit 40, in effect, compares this effective input control signal with the off-time indicating signal received via channel 36. When this comparison shows the off-time indicating signal exceeding the effective input control signal, the zero plus crossing detector 54 responds by developing its output at 56.

Gating the Appropriate Thyristor in Response to an Output from the Zero Plus Crossing Detector A pulse generator 58 receives the output at 56 from zero plus crossing detector 54 and immediately develops a pulse on channel 60 in response to receipt of this output. This pulse on channel 60 is supplied to an appropriate one of two pulse amplifiers 62 and 64, which immediately responds by supplying a gating pulse to the gate 21 of the appropriate thyristor 17a or 17b to initiate conduction of switch 16 via the gated thyristor.

For determining which of the two pulse amplifiers will receive the pulse from pulse generator 58, a pulse steerer 66 is provided. This pulse steerer 66 is a conventional bistable switching circuit that in one condition supplies the pulse to amplifier 62 and in its other condition supplies the pulse to amplifier 64. The condition of the switching circuit 66 is determined by the polarity of a control signal received from voltage sensor 24 via a control channel 67. When this control signal is positive, indicating that the voltage across the thyristor 17a is in a forward direction with respect to this particular thyristor, the pulse steerer steers the pulse to the amplifier 62. Conversely, when the control signal on channel 67 is negative, indicating that the voltage across thyristor 17b is in a forward direction relative to this particular thyristor, the pulse steerer steers the pulse to the other amplifier 64. The first amplifier 62 upon receipt of a pulse, supplies an amplified-pulse triggering signal to thyristor 17a, thus turning on this thyristor. The other amplifier 64, upon receipt of a pulse, supplies an amplified-pulse triggering signal to thyristor 17b, thus turning on this thyristor.

Between each of the pulse amplifiers 62 and 64 and its associated thyristor, we provide an isolating transformer 69 for electrically insulating the pulse amplifier from the power circuit 10. These transformers 69 and the isolating transformer in the voltage sensor effectively insulate the gate control 20, including the input control signal channel 22, from the power circuit 10.

Resetting Frequency Attenuator 34

For resetting the frequency attenuator 34 to a zero output condition, a reset circuit 70 is provided. So long as the frequency attenuator has an output, the reset circuit 70 tends to reset the frequency attenuator but is prevented from doing so by an inhibit signal received from the function generator 27 via channel 30. Reset circuit 70 is prevented from functioning so long as it receives this inhibit signal. When the output of function generator 27 terminates, as a result of no voltage being present across the switch 16, the inhibit channel ceases supplying the inhibit signal to reset circuit 70. The reset circuit responds to this condition by resetting the frequency attenuator to a zero output condition. Such resetting occurs at the end of each forward voltage period across a thyristor irrespective of whether or not gating of the forwardly-biased thyristor has occurred during the period forward voltage has appeared thereacross. Such resetting is important in that it permits a fresh comparison to be made at the beginning of each forward voltage period of the effective input control signal and the off-time indicating signal, thus assuring a consistent response to a given input control signal.

Permissive Device 47 for Controlling Summing Circuit 40

The summing circuit 40 is normally turned off, or disabled, and will turn on and continue turned on to perform its intended summing function only while it receives an enabling signal via a permissive channel 46 from a permissive device 47. Permissive device 47 is simply a switch that effectively closes when supplied with the output of function generator 27 via channel 32. So long as this permissive switch 47 is closed, an enabling signal is supplied therethrough via channel 46 to the summing circuit 40. Since the permissive device produces its enabling signal in response to an output from the function generator 27, the enabling signal is supplied only during and in coincidence with the non-conducting period of the static power switch 16. Accordingly during conduction periods of switch 16 (when function generator 27 is producing no output), the permissive device 47 acts to assure that the summing circuit will have an output of zero. Thus, unless the permissive device is turned on, the zero plus crossing detector 54 is receiving zero input.

It is important that the zero plus crossing detector 54 receive no positive input during conduction periods of static switch 16 because otherwise the detector 54 might be unprepared to initiate a new pulse-generating operation at the precise proper instant. For example, assume that the permissive device 47 was absent and that the summing circuit 40 was receiving via channel 22 a continuous input signal greater than one per unit and that this input signal minus the bias at 42 was being supplied as a positive effective input signal to the zero plus crossing detector during the conduction period of the static switch 16. When the static switch reached the end of its conduction period and the summing circuit 40 began receiving a new off-time indicating signal via channel 36, there would be no new zero crossing under the assumed conditions (because the zero plus crossing detector would already be receiving an input signal greater than zero). Accordingly, the zero plus crossing detector 54 would remain ineffective so long as the input control signal at 22 was greater than one. The permissive device 47 positively prevents the zero plus crossing detector 54 from entering such an ineffective conduction because it assures that the input to crossing detector 54 will be returned to zero during each conducting interval of static switch 16.

Although we show the permissive device 47 as preventing the summing circuit 20 from developing its output at 44 while the static switch 16 is conducting, it will be apparent that equivalent performance could be obtained if the summing circuit 20 was always allowed to develop its output at 44, and the permissive device 47 was arranged to normally block the zero-plus crossing detector 54 from effectively receiving this output until the end of a conducting period of the static switch 16.

General Discussion of Gating Control

Assuming that the input control signal at 22 is between 0 and 1 per unit, the conduction angle $\sigma$ will be directly proportional to the magnitude of the input control signal. This will be explained by referring to FIG. 2e, which depicts at 50 the output of the summing circuit when turned on by permissive device 47. It will be apparent from this figure that the time required for the output signal at 50 to cross the zero line following turn-on of the summing circuit 40 is directly proportional to the magnitude of the base level 52. This time to crossing is therefore inversely proportional to the magnitude of the input control signal on channel 22. Since this time to crossing corresponds to the non-conducting time of the switch, it will be apparent that the non-conducting time is inversely proportional to the magnitude of the input control signal at 22. Accordingly, the conduction angle $\sigma$ is directly proportional to the magnitude of the input control signal at 22 (assuming that the input control signal is between 0 and 1 per unit).

If the input control signal at 22 is greater than one per unit, then as soon as the summing circuit is turned on by the permissive device 47, the output 50 from the summing circuit will jump from its normal zero value to a positive value. This immediately turns on the zero-plus crossing detector 54 to produce immediate gating of the appropriate thyristor 17a or 17b. Irrespective of how much the input control signal at 22 exceeds one per unit, the summing circuit 40 cannot develop an output on channel 44 for receipt by the zero-plus crossing detector until turned on by the permissive device 47 at the start of the non-conduction period of switch 16. Hence, irrespective of how high the input control signal at 22 is, the zero-plus crossing detector 54 will not initiate a gating operation for either thyristor 17a or 17b until the then-conducting thyristor has ceased conducting. If symmetrical current conditions are present, then this relationship of the immediately preceding sentence will prevent the input control signal from producing a conduction angle of greater than 180°, irrespective of how high the input control signal is.

Figure 3:
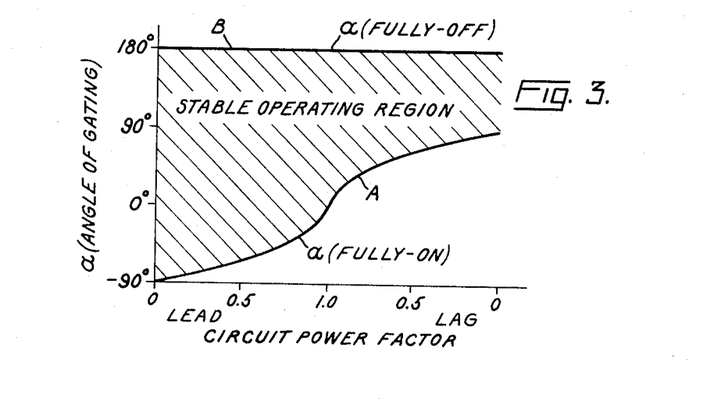
FIG. 3 is a graphic representation of the gating angles that will produce stable operation of a static switch for different circuit power factors.

As pointed out hereinabove, the relationship between gating angle and conduction angle varies widely as the power factor of the circuit varies. The curve A of FIG. 3 illustrates the gating angles α that will produce a fully-on condition of the switch for a given circuit power factor. A gating angle α of 180° will produce a fully-off condition, as indicated by the horizontal line B. The gating angle must fall between the two curves A and B in order to produce stable operation of the switch for a given circuit power factor. From this graph of FIG. 3, it can be observed that for purely resistive circuits (with a power factor of 1), stable operation can be obtained for gating angle variations of between 0° and 180°. A gating angle of 0° produces a fully-on condition, and a gating angle of 180° produces a fully-off condition. For a purely inductive circuit (with a lagging power factor of 0), the gating angle limits are 90° for fully-on and 180° for fully-off. For a purely capacitive circuit (with zero leading power factor), the gating angle limits are −90° for fully-on and 180° for fully-off.

Figure 2:
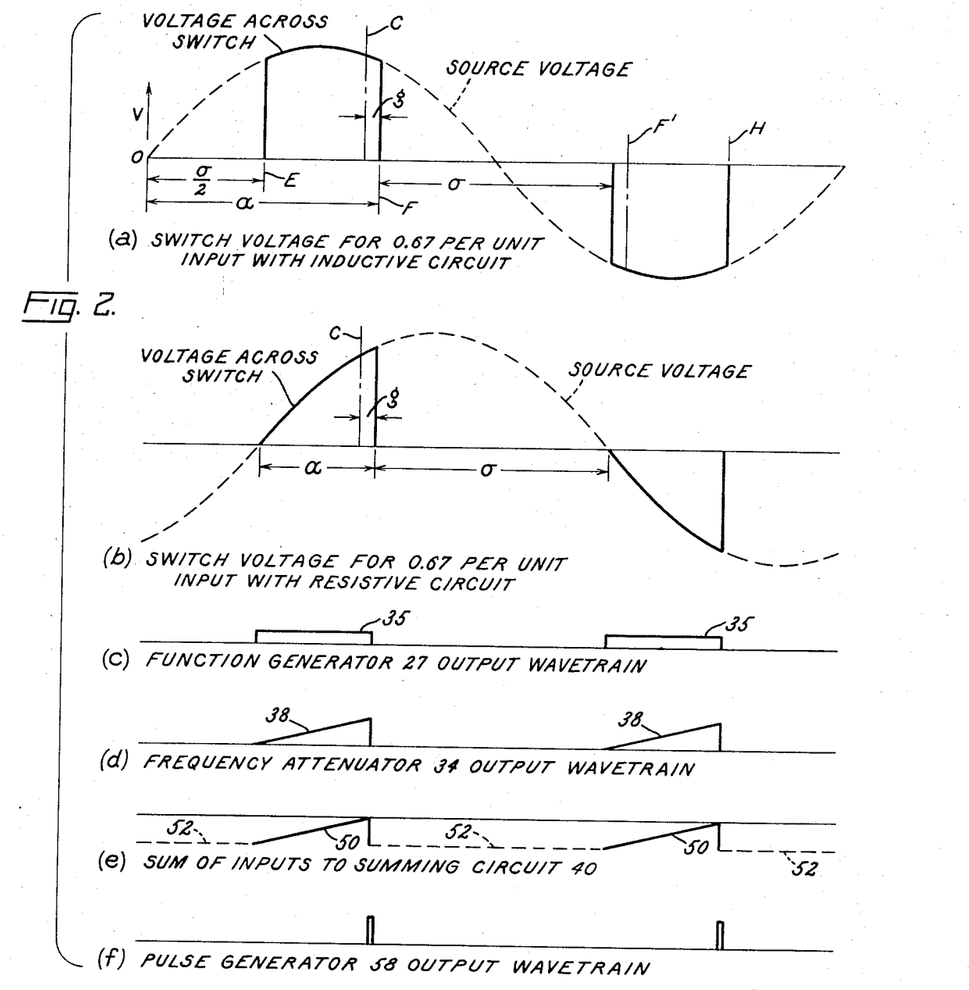
FIG. 2 is a graphic representation of certain electrical relationships that are present in the gating control of FIG. 1.

As pointed out hereinabove, an object of our invention is to produce substantially the same conduction angle of the switch for a given input signal despite wide variations in the power factor of the power circuit. FIG. 2 illustrates how an input signal of a given magnitude (e.g., 0.67 per unit of input) produces the same conduction angle both a purely resistive circuit and a purely inductive circuit. The partially dotted-line sine wave of FIG. 2a shows the source voltage for a purely inductive circuit, where gating takes place at a gating angle α measured from passage through zero of the source voltage. Up to the instant σ/2, the reverse thyristor is conducting, and no substantial voltage appears across the switch 16. At σ/2, the reverse thyristor ceases conducting, and forward voltage immediately appears across the switch. This causes the function generator 27 to develop an output 35 shown in FIG. 2c and the frequency attenuator 34 to develop the output 38 shown in FIG. 2d. The summing circuit develops an output shown at 50 in FIG. 2e, producing a zero crossing at α, which causes the pulse generator 58 to immediately trigger the forwardly-biased thyristor into conduction. Conduction continues for a conduction angle of σ. In a purely inductive circuit, the conduction period following voltage zero will equal the conduction period prior to voltage zero, since energy is released from the circuit inductance at the same rate as stored therein in the absence of resistance. Thus, at the instant α + σ, the switch 16 again becomes nonconducting, and the function generator 27 again turns on, causing another gating pulse to be developed after a non-conducting time interval equal in length to that required for the first gating operation.

The sine wave of FIG. 2b represents the source voltage in a purely resistive power circuit. Gating is shown taking place at a gating angle α that results in a conduction angle σ equal to the conduction angle σ in FIG. 2a. The curves of FIGS. 2a and 2b are horizontally offset so that these equal conduction angles are vertically aligned. In the resistive circuit, when the source voltage crosses zero, voltage across the switch does likewise, causing the function generator 27 to begin its output immediately following the zero crossing of the source voltage. This results in the frequency attenuator 34 developing an output 38 of the same shape as it did with the purely inductive circuit. Thus, with the resistive power circuit, the same input signal as fed to the summing circuit 40 in the case of the inductive power circuit will result in the output 50 from the summing circuit crossing zero at the same time after the function generator starts its output as with the inductive circuit. Accordingly, for a given input signal at 22, the nonconducting period for the switch 16 will be the same for both the inductive and the resistive power circuits. It can be shown that if the time interval that the switch remains in its nonconducting state between conducting periods is held constant, then the conduction angle will also be held constant irrespective of the circuit power factor, assuming symmetrical current conditions where the thyristors 17a and 17b have equal conduction angles. Accordingly, by holding this nonconducting time interval constant for a given input signal, we obtain the same conduction angle for a given input signal, irrespective of the circuit power factor, again assuming symmetrical current conditions.

The Effect on Current Symmetry of a Change in Input Signal

Referring to the resistive power circuit application of FIG. 2b, assume that the input control signal is increased by an amount that reduces the gating angle α by g degrees, as shown by the dot-dash line C. This would produce the same change in α on each half cycle of source voltage and would correspondingly increase the conduction angle σ during each conduction period. Accordingly, in the resistive power circuit, symmetrical current conditions would be maintained despite the change in gating angle.

Referring next to the inductive power circuit application of FIG. 2a, assume that the input signal is increased between instants E and F by an amount to reduce the gating angle α by g degrees, as shown by the dot-dash lines C. This would result in the conduction angle increasing by an amount 2g, and a corresponding delay in the reappearance of voltage at F' by an amount g. The nonconduction period following F' would be the same as on the previous half cycle, and conduction would thus be initiated again at H and would continue through the same conduction angle as before the change in input signal. The next conduction period would begin at a time corresponding to C and continue until F'. Thus it will be apparent that the change in input signal has resulted in an asymmetrical current condition, with the forward conduction periods (between C and F') longer than the reverse conduction periods. If the input signal is further increased at an instant between E and C, the forward conduction period between C and F' would be further increased without increasing the reverse conduction period, thus making the asymmetry even more pronounced.

This asymmetrical current condition is an undesirable one because it results in a d-c current component flowing through the power circuit, and such current component can produce objectionable saturation and overheating effects. One factor responsible for the development of this asymmetrical condition is that we have, in the above-described example, changed all our nonconducting periods by a fixed amount for a given change in input signal, and, in the purely inductive circuit, this has increased one conduction angle without changing the other.

We overcome this problem by providing a conduction-angle balancing circuit 80 which functions in a manner soon to be described to quickly restore the conduction angles to their original condition of equality despite the change in input signal. A description of this balancing circuit 80 follows.

Conduction Angle Balancing

Figure 1B:
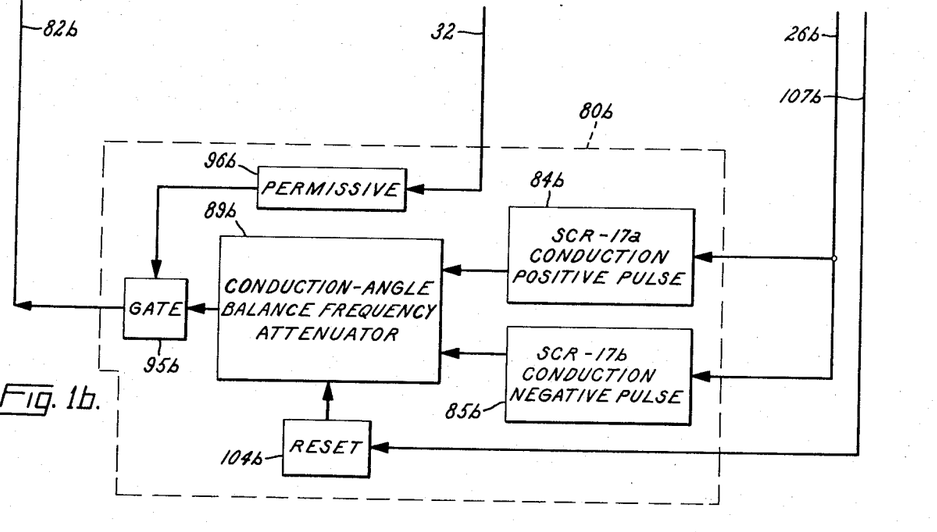

For forcing the conduction angles of the two thyristors 17a and 17b to be the same for a given input control signal at 22, we provide two conduction-angle balancing circuits 80 and 80b (FIGS. 1a and 1b). Each of these conduction-angle balancing circuits 80 and 80b develops a unidirectional balance-indicating signal that has a magnitude proportional to the difference between successive conduction angles of the two thyristors.

On those pairs of successive conducting periods during which thyristor 17a conducts preceding thyristor 17b, the first balancing circuit 80 compares the conduction angle of thyristor 17a with that of thyristor 17b and developes a first balance-indicating signal. This balance-indicating signal is unidirectional and has a magnitude proportional to the difference between the compared conduction angles of the two thyristors. This balance indicating signal is negative if forward thyristor 17a has the larger conduction angle and positive if reverse thyristor 17b has the larger conduction angle.

On those pairs of successive conduction periods during which thyristor 17b conducts preceding thyristor 17a, the other balancing circuit 80b (FIG. 1b) compares the conduction angle of thyristor 17b with that of thyristor 17a and develops a second unidirectional balance-indicating signal that has a magnitude proportional to the difference between the compared conduction angles of the two thyristors. This balance-indicating signal is negative if the reverse thyristor 17b has the longer conduction angle and positive if the forward thyristor 17a a longer conduction angle.

The first balance-indicating signal is fed to summing circuit 40 via a channel 82 and is added to the input signals received via the other channels 22, 42, and 36 during the timing period immediately preceding firing of the first thyristor 17a. If the first balance-indicating signal is positive, indicating that forward thyristor 17a has a shorter conduction angle than 17b, the balance-indicating signal acts to advance the triggering of 17a, thereby lengthening its conduction angle and causing a resultant shortening of the conduction angle of the other thyristor 17b, thus forcing these conduction angles toward equality, all in a manner soon to be described in detail. Conversely, if the first balance-indicating signal is negative, it acts to retard triggering of thyristor 17a, thereby shortening its conduction angle and lengthening the conduction angle of the other thyristor 17b, to force these conduction angles toward equality.

The second balance-indicating signal is fed to summing circuit 40 via a channel 82b and is added to the input signals received via the other channels 22, 42, and 36 during the timing period immediately preceding firing of reverse thyristor 17b. If the second balance-indicating signal is positive, indicating that reverse thyristor 17b has a shorter conduction angle than 17a, the balance-indicating signal acts to advance the triggering of thyristor 17b, thereby lengthening its conduction angle and causing a resultant shortening of the conduction angle of the other thyristor 17a, thus forcing these conduction angles toward equality, all in a manner soon to be described in more detail. Conversely, if the second balance-indicating signal is negative, it acts to retard triggering of thyristor 17b, thereby shortening its conduction angle and lengthening the conduction angle of the other thyristor 17a to force these conduction angles toward equality.

Referring now more specifically to the conduction-angle balancing circuit 80, this circuit comprises two pulse generators 84 and 85. Whenever thyristor 17a begins conducting, pulse generator 84 produces a constant amplitude pulse of negative polarity (shown at 86 in FIG. 4c) having a duration equal to the duration of the conducting interval of thyristor 17a. When the other thyristor 17b conducts, the other pulse generator 85 produces a constant amplitude pulse of positive polarity (shown at 87 in FIG. 4c) having a duration equal to the duration of the conduction interval of 17b. Suitable sensing means including voltage sensor 24 and channel 26 is provided for turning on the proper pulse generator 84 or 85 depending upon which thyristor 17a or 17b is conducting.

The pulse developed by each pulse generator is fed to a frequency attenuator 89, in the form of an integrator, that integrates the pulse input to provide a voltage that linearly increases in the direction of the pulse input polarity. The negatively increasing voltage resulting from negative pulse 86 is shown at 90 in FIG. 4d, and the positively increasing voltage resulting from a positive pulse 87 is shown at 91 in FIG. 4d. As shown at 94 in FIG. 4d, the peak voltage to which the negative signal 90 increases is held until the positively increasing signal 91 is received, following which the positively increasing signal is added to this peak value to provide (at the instant 93 that forward voltage begins on thyristor 17a) a first difference signal 92 equal to the difference between the peak value of the two voltages 90 and 91. This first difference signal 92 has a magnitude that is proportional to the difference in time duration between the two pulses 86 and 87, which in turn equals the difference in the conduction angles of the two thyristors 17a and 17b during those pairs of successive conduction periods when thyristor 17a conducts preceding thyristor 17b. In a preferred form of the invention, the output from attenuator 89 is a signal proportional to difference signal 92, and this proportional signal we term the first balance-indicating signal 99.

The balance-indicating signal 99 is applied to summing circuit 40, but only from the instant 93 when the summing circuit is operating during the period that forward voltage is on forward thyristor 17a preceding its firing. In this respect, a gate 95 normally blocks this first balance-indicating signal 99 from reaching summing circuit 40, but this gate is rendered nonblocking when forward voltage begins building up across forward thyristor 17a, thus allowing the first balance-indicating signal then to be supplied to the summing circuit for the entire period when forward voltage is present on non-conducting forward thyristor 17a prior to its firing. A suitable permissive circuit 96 renders gate 95 non-blocking during this interval. In the disclosed embodiment, the first balance-indicating signal 99 is not permitted to reach the summing circuit 40 during the summing period before firing of the other thyristor 17b.

The second conduction-angle balancing circuit 80b (FIG. 1b) generally corresponds to the first balancing circuit 80 (FIG. 1a) except in several respects soon to be described. Corresponding parts of the two circuits are designated with the same reference numerals, but the suffix b is added to those of circuit 80b. The pulse generator 84b of balancing circuit 80b corresponds to the pulse generator 84 of balancing circuit 80 except that the constant amplitude pulse produced thereby in response to turn-on of thyristor 17a is positive instead of negative. Such positive pulses are shown at 86b in FIG. 4f. Pulse generator 85b corresponds to the pulse generator 85 except that the constant amplitude pulse produced thereby in response to turn-on of thyristor 17b is negative instead of positive. Such negative pulses are shown at 87b in FIG. 4f. The pulses produced by pulse generators 84b and 85b have a duration equal to the duration of the conducting intervals for thyristors 17a and 17b, respectively.

The pulse developed by each pulse generator 84b and 85b is fed to a frequency attenuator 89b, which operates in substantially the same manner as the frequency attenuator 89, producing a difference signal 92b proportional to the difference in the compared conduction angles of the two thyristors 17a and 17b and a balance-indicating signal 99b (FIG. 4e) proportional to this difference signal. The second balance-indicating signal 99b is developed at the conclusion of those pairs of successive conduction periods during which thyristor 17b conducts preceding thyristor 17a.

As shown in FIG. 4e, the second balance-indicating signal 99b is applied to summing circuit 40, but only from the instant 105 when the summing circuit is operating during the period that forward voltage is on thyristor 17b preceding its firing. In this respect, the gate 95b normally blocks this second balance-indicating signal from reaching summing circuit 40, but this gate is rendered non-blocking when forward voltage begins building up across thyristors 17b, thus allowing the second balance-indicating signal 99b then to be supplied to summing circuit 40 for the entire period when forward voltage is present on nonconducting thyristor 17b prior to its firing. A suitable permissive circuit 96b renders gate 95b nonblocking during this interval. This second balance-indicating signal 99b is not permitted to reach the summing circuit 40 during the summing period before the firing of the other thyristor 17a.

As previously pointed out, if the first balance-indicating signal 99 is negative, it retards the firing point of thyristor 17a, thus lengthening the conduction angle of 17a. This retardation takes place because when the balance-indicating signal 99 is received at instant 93 in FIG. 4c, the base line 52 shifts to a more negative position, thus increasing the time required by the increasing signal 50 received via channel 36 to cross the zero line.

In an inductive circuit having a power factor appreciably different from unity, retarding the gating angle of thyristor 17a results in advancing the gating angle of the other thyristor 17b. This is the case because retarding the gating angle of thyristor 17a by an amount X as shown at 100 in FIG. 4c results in shortening the conduction period after voltage zero as shown at 102. It will be assumed that the circuit is purely inductive, in which case the shortening at 102 will be equal to X, thus shortening the total conduction time of thyristor 17a by 2X degrees.

The change at 102 advances the start of the timing period for firing of the reverse thyristor 17b by X degrees, and this has the effect of lengthening the next conduction period of thyristor 17b by 2X degrees. This lengthening of the conduction period for 17b coupled with the previous shortening of the conduction period for 17a drives these two conduction periods toward equality. This corrective action by balancing circuit 80 is repeated during every timing period preceding triggering of the forward thyristor 17a, (e.g., at 107 and 109 in FIG. 4) if the two immediately preceding conduction angles are not then equal. Although this corrective action by the single conduction-angle balancing circuit 80 is sufficient for many applications; we have found that under some operating conditions, there may arise instabilities resulting in asymmetrical currents that cannot be effectively eliminated by the gating control 20 if it contains only the single balancing circuit 80 to generate corrective signals for equalizing the conduction angles.

Figure 4:
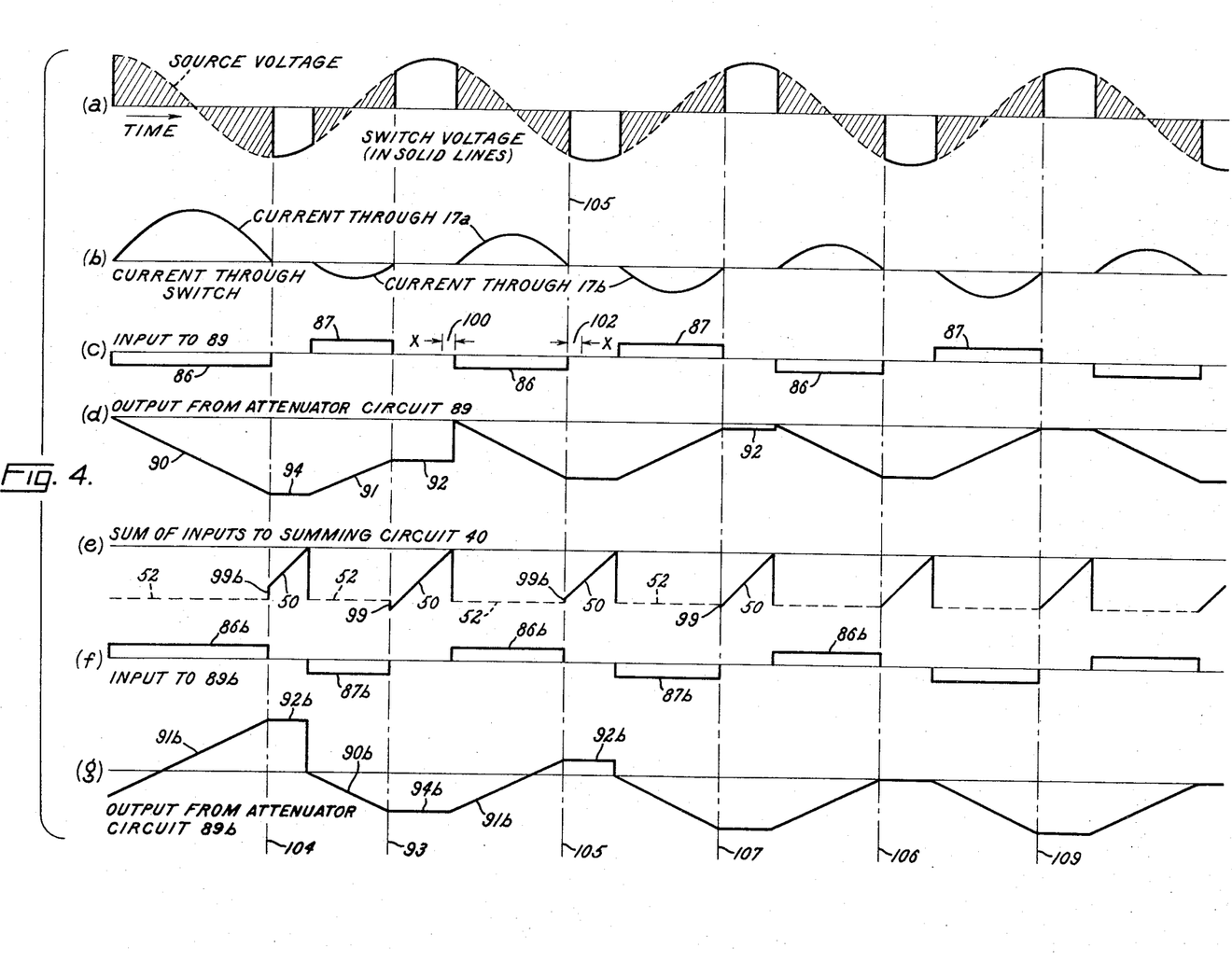
FIG. 4 is another graphic representation of certain electrical relationships that are present in the gating control of FIG. 1, with particular emphasis on the conduction-angle balancing feature of the switch.

To enable the gating control 20 to effectively eliminate such instabilities, we provide for additional corrective action during the timing period preceding each firing of the other thyristor 17b, e.g., at instants 104, 105 and 106 in FIG. 4. As pointed out hereinabove, this additional corrective action involves supplying to the summing circuit 40 via channel 82b the balance-indicating signal 99b derived from balancing circuit 80b. This balance-indicating signal 99b is directly proportional to the difference between the conduction angles of thyristors 17b and 17a during the two immediately preceding conduction periods of these thyristors. If the conduction angle of 17b is shorter than that of 17a (as is the case between instants 104 and 105 in FIG. 4), a positive balance-indicating signal 99b is supplied to the summing circuit 40 beginning with the instant 105, and this has the effect of advancing the next firing of thyristor 17b, thereby lengthening its conduction angle and shortening that of the other thyristor 17a on its next conduction period. The net effect of these changes is to drive the conduction angles further toward a condition of equality.

In the disclosed control 20, each conduction period, without exception, is compared with the conduction period that immediately precedes it, and at the end of the later conduction period, a fresh balance-indicating signal proportional to the difference in length of these two conduction periods is derived for controlling the instant at which the next thyristor is triggered on. Each thyristor, and not merely a single one, is controlled in this manner when its turn comes for triggering. As shown in FIG. 4e, the timing operation preceding the triggering of each thyristor is made dependent upon a freshly derived balance-indicating signal.

It will be apparent from FIG. 4 that initially the balance-indicating signals 99 and 99b are relatively large, indicating a large difference between the conduction angles of thyristors 17a and 17b; but this difference is reduced by each successive correction so that a condition of substantial equality is quickly achieved, as will be apparent from the substantial equal length of the last two conduction periods illustrated in FIG. 4b.

Our disclosed control, relying upon the two conduction-angle balancing circuits 80 and 80b operating as above described, has been found to be highly effective in eliminating instabilities which result in asymmetrical currents in power circuit 10. Such instabilities have developed with the control of the aforesaid Kelley et al. application when the input control signal at 22 was rapidly changed over a wide range or the power factor of the load 14 was rapidly changed over a wide range. Our improved control is able to effectively and quickly eliminate instabilities produced by such changes.

Another improved capability that our control has is the ability to restore current symmetry even when the switch 16 is fully on and the thyristor 17b is operating with a conduction angle exceeding 180°. Our control acts to restore symmetry under such conditions merely by retarding the firing point of thyristor 17b to shorten its conduction angle. This initial step (which is initiated by balancing circuit 80b) sets into motion all of the balancing action described hereinabove. But if only the single balancing circuit 80 were present, current symmetry could not be restored in this manner. Balancing circuit 80 can directly control the firing of only the thyristor 17a, but it could not advance the firing of thyristor 17a under the assumed conditions because the other thyristor 17b would by conducting up until the original instant that thyristor 17a is being fired. Hence, thyristor 17a is reversely biased until such instant and would not accept a firing pulse delivered prior to such instant.

Although the above description has assumed that the power circuit is purely inductive, it is to be understood that operation of the gating control is substantially the same whether or not the circuit is purely inductive. Irrespective of the power factor of the power circuit 10, the same comparison steps and corrective steps take place preceding the firing of each thyristor.

In a preferred form of the invention, the first conduction-angle balancing frequency attenuator 89 is reset to a zero output condition each time the thyristor 17a is fired, and the other conduction-angle balancing frequency attenuator 89b is reset to a zero output condition each time thyristor 17b is fired. This resetting of attenuator 89 is effected by reset means 104, which is turned on via channel 107 each time pulse amplifier 62 receives a pulse from pulse generator 58; whereas resetting of attenuator 89b is effected by reset means 104b each time pulse amplifier 64 receives a pulse from pulse generator 58.

It is to be noted that control power for the various components of the gating control 20 is derived from a control power supply that is independent of power circuit 10 and independent of voltage across switch 16. Leads from this supply to the function generator 27 are shown at 105. Similar leads extend to all the other components of the gating control 20 requiring control power but, for simplicity, are not shown. Having an independent control power supply is advantageous in isolating the gating control from the effects of variations in power circuit voltage and current and in making the control power independent of voltage across the switch 16.

MODIFIED EMBODIMENT

Although we have specifically described our gating control only in connection with an a-c static switch comprising thyristors connected in inverse parallel relationship, the invention in its broader aspects has application to other switching arrangements. For example, it can be used with the switching arrangement shown in FIG. 5, where a transformer 120 with a center-tapped secondary winding 121 is shown. A load 124 has one terminal 125 connected to the center tap and its opposite terminal 126 connected to the upper terminal of the secondary winding 121 through a thyristor 130. The load terminal 126 is also connected to the lower terminal of secondary winding 121 through a thyristor 132. The two thyristors 130 and 132 are cyclically triggered into conduction in synchronism with the voltage appearing across secondary winding 121. This latter voltage is an a-c voltage inasmuch as the primary winding of the transformer is energized by an a-c source. The current through the load 124 is unidirectional, and the average value of voltage developed across the load 124 depends upon when the thyristors are triggered and how long they conduct during each cycle.

Figure 5:
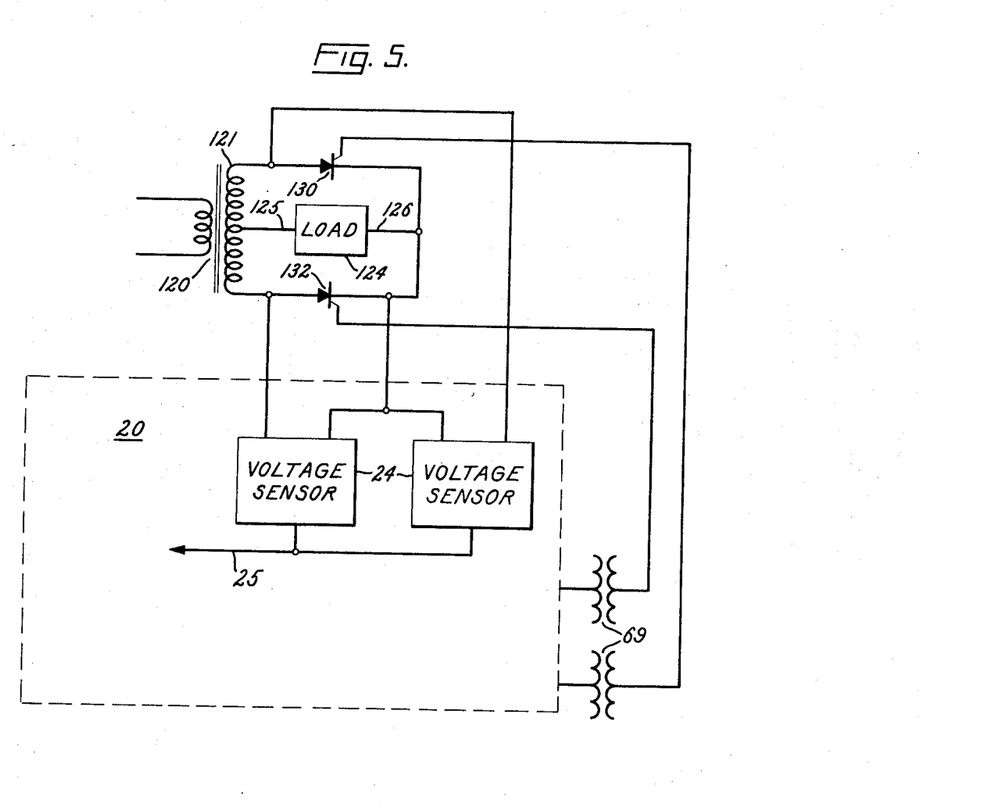
FIG. 5 is a circuit diagram of a modified form of the invention.

Our control 20 of FIG. 1 can be used to control the conduction angles of the two thyristors 130 and 132 in generally the same manner as it is used in FIG. 1. The principal difference in applying the control is that in FIG. 6 means must be provided for sensing the voltage across each individual thyristor since the instantaneous voltages across the two thyristors of FIG. 6 are different. Such sensing means preferably takes the form of two voltage sensors designated 24. Their output is supplied to a common channel 25 leading to a function generator corresponding to 27 in FIG. 1. The output from the voltage sensors is also applied to the pulse steerer (66 in FIG. 1) and to the balancing circuits 80 and 80b, as shown in FIG. 1. The output leads from gating control 20 are shown connected through isolating transformers 69 to the gates of the thyristors 130 and 132. In the control of FIG. 6, there are conduction-angle balancing circuits (corresponding to 80 and 80b of FIG. 1) that operate in the same manner as described hereinabove to equalize the conduction angles of the two thyristors 130 and 132.

While we have shown and described particular embodiments of our invention, it will be obvious to those skilled in the art that various changes and modifications may be made without departing from our invention in its broader aspects; and we, therefore, intend herein to cover all such changes and modifications as fall within the true spirit and scope of our invention.

What we claim as new and desire to secure by Letters Patent of the United States is:

1. A gating control for an a-c phase controlled static switch comprising first and second thyristors connected in inverse parallel relationship in a power circuit that is operable with a power factor substantially different from unity, said gating control comprising:

a. means for developing an off-time indicating signal that varies in magnitude as a direct function of the time interval that said thyristors both remain in their nonconducting state preceding the gating of either thyristor, b. means for supplying an effective input control signal to said gating control that has a magnitude indicative of the conduction angles desired for said thyristors, c. first balancing means for comparing the conduction angles of said thyristors on those pairs of successive conduction periods during which said first thyristor conducts preceding said second thyristor and for deriving a first balance-indicating signal having a magnitude indicative of the difference between said conduction angles compared by said first balancing means, d. second balancing means for comparing the conduction angles of said thyristors on those pairs of successive conduction periods during which said second thyristor conducts preceding said first thyristor and for deriving a second balance-indicating signal having a magnitude indicative of the difference between said conduction angles compared by said second balancing means, e. summing means effective while said thyristors are in their nonconducting state immediately preceding the firing of said first thyristor for adding together:
  i. said effective input control signal,
  ii. said off-time indicating signal for the period immediately preceding firing of said first thyristor, and
  iii. said first balance-indicating signal,
to provide a first gating-control signal that has a magnitude dependent upon the sum of signals i, ii, and iii, f. means for developing a gating pulse for delivery to said first thyristor when said first gating control signal reaches a predetermined level, whereby said first thyristor is gated into conduction at a gating angle dependent on the magnitudes of said effective input control signal and said first balance-indicating signal, g. said summing means also being effective while said thyristors are in their nonconducting state immediately preceding the firing of said second thyristor for adding together:
  i. said effective input control signal,
  ii. said off-time indicating signal for the period immediately preceding firing of said second thyristor
  iii. said second balance-indicating signal,
to provide a second gating control signal that has a magnitude dependent upon the sum of signals i, ii, and iii of (g), (h) and means for developing a gating pulse for delivery to said second thyristor when said second gating control signal reaches a predetermined level, whereby said second thyristor is gated into conduction at a gating angle dependent on the magnitudes of said effective input control signal and said second balance-indicating signal.

2. The gating control of claim 1 in which said summing means responds to said balance-indicating signals to cause said gating angles to be varied in a direction to produce equal conduction angles during successive conduction periods.

3. A gating control as defined in claim 1 in which:
a. said effective input control signal for desired conduction angles less than 180° has a polarity opposite to that of said off-time indicating signal, and
b. said balance-indicating signals have a polarity the same as said off-time indicating signal when the conduction angle of the thyristor that conducts first during a given pair of compared conduction periods is shorter than the conduction angle of the second-to-conduct thyristor during said given pair of conduction periods.

4. A gating control for a switching arrangement comprising a pair of thyristors, said gating control comprising:
a. pulse supply means for developing gating pulses that are delivered to alternate thyristors at predetermined gating angles during successive half cycles of voltage appearing across said switching arrangement, thus causing said alternate thyristors successively to conduct for predetermined conduction angles,
b. first balancing means for measuring and comparing the conduction angles of said alternate thyristors on those pairs of successive conducting periods during which a first one of said thyristors conducts preceding a second one of said thyristors and for deriving a first balance-indicating signal having a magnitude indicative of the difference between said conduction angles compared by said first balancing means,
c. second balancing means for measuring and comparing the conduction angles of said alternate thyristors on those pairs of successive conducting periods during which said second thyristor conducts preceding said first thyristor and for deriving a second balance-indicating signal having a magnitude indicative of the difference between said conduction angles compared by said second balancing means,
d. means receiving and sensitive to said first balance-indicating signal and controlling said pulse supply means for varying as a function of the magnitude of said first balance-indicating signal the gating angles at which said gating pulses are delivered to said first thyristor, said gating angle variation being in a direction to produce equal conduction angles during successive conduction periods,
e. and means receiving and sensitive to said second balance-indicating signal and controlling said pulse supply means for varying as a function of the magnitude of said second balance-indicating signal the gating angles at which said gating pulses are delivered to said second thyristor, said latter gating angle variation being in a direction to produce equal conduction angles during successive conducting periods.

5. The gating control of claim 4 in which said static switching arrangement is an a-c static switch in which said pair of thyristors are connected in inverse parallel relationship for controlling a power circuit that is operable with a power factor substantially different from unity.

6. The gating control of claim 4 in which:
a. each of said balancing means comprises means for developing first and second signals of opposite polarities having respective magnitudes substantially proportional to the conduction angles compared by a given balancing means during successive conduction periods,
b. said first balancing means comprises means for adding together said opposite-polarity signals developed by by said first balancing means to derive a signal proportional to the difference between said opposite-polarity signals which serves as said first balance-indicating signal, and
c. said second balancing means comprises means for adding together said opposite-polarity signals developed by said second balancing means to derive an additional signal proportional to the difference between said latter opposite-polarity signals which serves as said second balance-indicating signal.

* * * * *